US010575204B2

(12) United States Patent
Lee et al.

(10) Patent No.: US 10,575,204 B2
(45) Date of Patent: *Feb. 25, 2020

(54) METHOD FOR REPORTING A RADIO LINK PROBLEM AND A DEVICE THEREFOR

(71) Applicant: LG Electronics Inc., Seoul (KR)

(72) Inventors: Sunyoung Lee, Seoul (KR); Seungjune Yi, Seoul (KR); Sungjun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/405,388

(22) Filed: May 7, 2019

(65) Prior Publication Data

US 2019/0261208 A1    Aug. 22, 2019

Related U.S. Application Data

(63) Continuation of application No. 15/810,547, filed on Nov. 13, 2017, which is a continuation of application
(Continued)

(51) Int. Cl.
*H04W 24/10* (2009.01)
*H04L 1/18* (2006.01)
(Continued)

(52) U.S. Cl.
CPC ............. *H04W 24/10* (2013.01); *H04L 1/187* (2013.01); *H04W 56/00* (2013.01); *H04W 56/0005* (2013.01); *H04W 72/0413* (2013.01)

(58) Field of Classification Search
CPC ..... H04W 24/08; H04W 24/10; H04W 56/00; H04W 56/0005; H04W 56/0045; H04W 72/04; H04W 72/0413; H04W 74/002; H04W 74/08; H04W 76/00; H04W 76/027; H04W 76/028; H04W 24/04;
(Continued)

(56) References Cited

U.S. PATENT DOCUMENTS 8,488,443 B2    7/2013  Lee et al.
8,711,709 B2    4/2014  Marinier et al.
(Continued)

FOREIGN PATENT DOCUMENTS

CN    102027793    4/2011
CN    103314618    9/2013

OTHER PUBLICATIONS

Catt et al., "RLM considerations for dual connectivity," 3GPP TSG RAN WG2 Meeting #83bis, R2-133363, Ljubljana, Slovenia, Oct. 7-11, 2013, pp. 1-3.

*Primary Examiner* — Tri H Phan
(74) *Attorney, Agent, or Firm* — Fish & Richardson P.C.

(57) ABSTRACT

A method is provided for operating by a user equipment (UE) connected with a master base station (BS) and a secondary BS in a wireless communication system. The UE configures a first cell supporting a contention based random access and a second cell other than the first cell. The first cell and the second cell are associated with the secondary BS. The UE determines whether a radio link problem is occurred on the first cell or the second cell. The UE indicates the radio link problem to an upper layer only if the radio link problem occurs on the first cell.

20 Claims, 12 Drawing Sheets

Related U.S. Application Data

No. 15/029,515, filed as application No. PCT/KR2014/008699 on Sep. 18, 2014, now Pat. No. 9,838,901.

(60) Provisional application No. 61/894,902, filed on Oct. 23, 2013.

(51) Int. Cl.
*H04W 56/00* (2009.01)
*H04W 72/04* (2009.01)

(58) Field of Classification Search
CPC .......... H04W 76/18; H04L 1/18; H04L 1/187; H04L 5/00; H04L 5/001; H04L 5/0091; H04B 7/26
See application file for complete search history.

(56) References Cited

U.S. PATENT DOCUMENTS

| | | | |
|---|---|---|---|
| 9,042,881 B2* | 5/2015 | Kwon | H04B 1/1027 455/423 |
| 9,113,450 B2 | 8/2015 | Pelletier | |
| 9,118,452 B2* | 8/2015 | Park | H04L 5/001 |
| 9,258,747 B2 | 2/2016 | Sivanesan | |
| 9,313,807 B2* | 4/2016 | Park | H04W 74/0833 |
| 9,332,473 B2 | 5/2016 | Yamada | |
| 9,565,668 B2 | 2/2017 | Yi | |
| 9,596,701 B2 | 3/2017 | Park et al. | |
| 9,699,823 B2* | 7/2017 | Park | H04L 1/1812 |
| 9,699,825 B2 | 7/2017 | Lee et al. | |
| 9,706,418 B2 | 7/2017 | Decarreau | |
| 9,713,022 B2 | 7/2017 | Yamada | |
| 9,763,283 B2 | 9/2017 | Jung | |
| 9,807,656 B2* | 10/2017 | Fan | H04W 76/10 |
| 9,814,075 B2 | 11/2017 | Kim | |
| 9,838,901 B2 | 12/2017 | Lee | |
| 9,854,495 B2 | 12/2017 | Kim | |
| 9,887,809 B2 | 2/2018 | Yi | |
| 9,930,581 B2 | 3/2018 | Bai | |
| 9,999,072 B2* | 6/2018 | Park | H04L 5/001 |
| 10,009,952 B2 | 6/2018 | Kim | |
| 10,015,823 B2 | 7/2018 | Ohuchi | |
| 10,187,193 B2 | 1/2019 | Kim | |
| 2010/0118801 A1 | 5/2010 | Yavuz et al. | |
| 2011/0092215 A1 | 4/2011 | Back | |
| 2012/0281548 A1 | 11/2012 | Lin et al. | |
| 2013/0005388 A1 | 1/2013 | Naka et al. | |
| 2013/0183974 A1 | 7/2013 | Johansson et al. | |
| 2013/0258975 A1 | 10/2013 | Krishnamurthy et al. | |
| 2015/0078286 A1 | 3/2015 | Kim et al. | |
| 2015/0181479 A1 | 6/2015 | Lin et al. | |
| 2016/0037579 A1 | 2/2016 | Jung et al. | |
| 2016/0094446 A1 | 3/2016 | Kazmi | |
| 2016/0182276 A1 | 6/2016 | Wu | |
| 2016/0183158 A1 | 6/2016 | Decarreau | |
| 2016/0191221 A1 | 6/2016 | Fukuta et al. | |
| 2016/0192269 A1 | 6/2016 | Kim et al. | |
| 2016/0192433 A1 | 6/2016 | Deenoo | |
| 2016/0242224 A1 | 8/2016 | Liu et al. | |
| 2016/0242226 A1 | 8/2016 | Fushiki et al. | |
| 2017/0006587 A1 | 1/2017 | Kim | |
| 2018/0070259 A1* | 3/2018 | Lee | H04W 24/10 |
| 2018/0295647 A1* | 10/2018 | Park | H04L 5/001 |
| 2019/0028151 A1 | 1/2019 | Zhang | |

* cited by examiner

FIG. 3
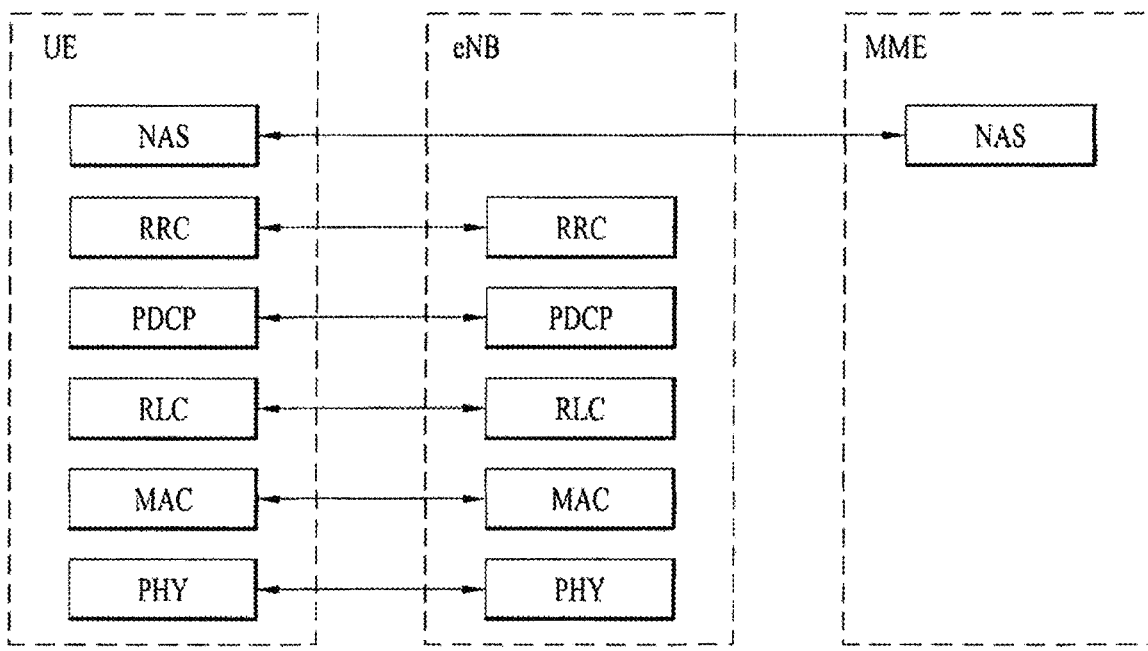
(a) Control-Plane Protocol Stack
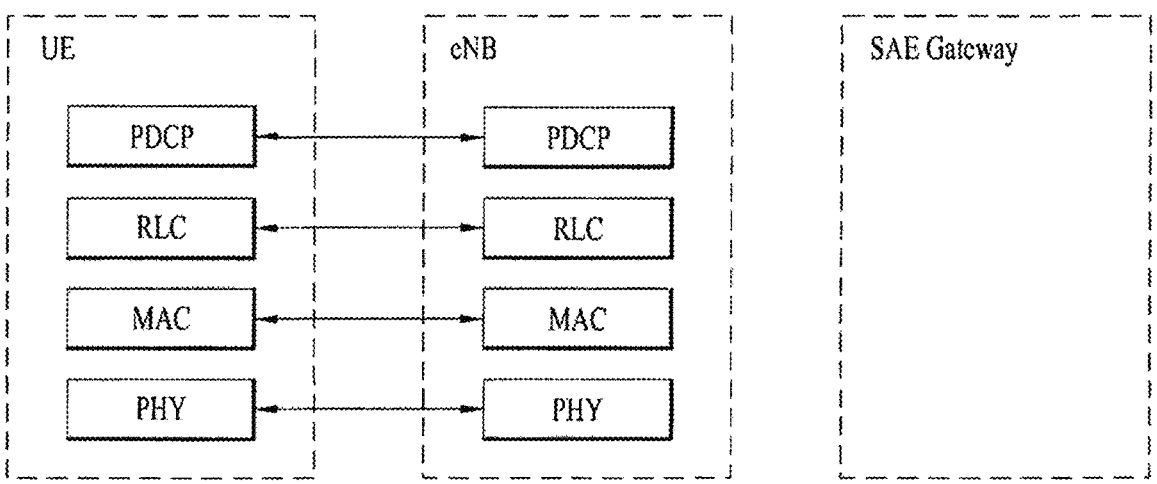
(b) User-Plane Protocol Stack Component carrier (a) C-Plane connectivity of eNBs involved in dual connectivity

METHOD FOR REPORTING A RADIO LINK PROBLEM AND A DEVICE THEREFOR

CROSS-REFERENCE TO RELATED APPLICATIONS

This application is a continuation of U.S. application Ser. No. 15/810,547, filed on Nov. 13, 2017, which is a continuation of U.S. application Ser. No. 15/029,515, filed on Apr. 14, 2016, now U.S. Pat. No. 9,838,901, which was filed as the National Phase of PCT International Application No. PCT/KR2014/008699, filed on Sep. 18, 2014, which claims priority under 35 U.S.C. 119(e) to U.S. Provisional Application No. 61/894,902, filed on Oct. 23, 2013, all of which are hereby expressly incorporated by reference into the present application.

BACKGROUND OF THE INVENTION

The present invention relates to a wireless communication system and, more particularly, to a method for reporting a radio link problem and a device therefor.

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an Evolved Universal Mobile Telecommunications System (E-UMTS) as an exemplary radio communication system. An E-UMTS is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), a plurality of Evolved Node-Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

SUMMARY OF THE INVENTION

An object of the present invention devised to solve the problem lies in a method and device for reporting a radio link problem. The technical problems solved by the present invention are not limited to the above technical problems and those skilled in the art may understand other technical problems from the following description.

The object of the present invention can be achieved by providing a method for operating by an apparatus in wireless communication system, the method comprising; receiving an indicator indicating which cell is a first cell of the second BS from either the first BS or the second BS; detecting a radio link problem on a cell belonging to the second BS; and reporting the detected radio link problem of the second BS to the first BS if the cell, on which the radio link problem is detected, is indicated as the first cell by the indicator.

In another aspect of the present invention provided herein is an apparatus in the wireless communication system, the apparatus comprising: an RF (radio frequency) module; and a processor configured to control the RF module, wherein the processor is configured to receive an indicator indicating which cell is a first cell of the second BS from either the first BS or the second BS, to detect a radio link problem on a cell belonging to the second BS, and to report the detected radio link problem of the second BS to the first BS if the cell, on which the radio link problem is detected, is indicated as the first cell by the indicator.

Preferably, the first cell is always activated in the second BS.

Preferably, the first cell is allowed to perform a contention-based random access procedure.

Preferably, the first cell is configured with a Physical Uplink Control Channel (PUCCH).

Preferably, the radio link problem in a Physical layer is that the cell is out of sync for a configured time duration.

Preferably, the radio link problem in a medium access control (MAC) layer whose data is transmitted to the cell is that a maximum number of random access preamble retransmissions on the cell has been reached.

Preferably, the method further comprises; stopping all uplink (UL) transmission to the second BS if the cell is indicated as the first cell.

Preferably, the method further comprises; reporting a cause of the radio link problem of the second BS if the cell is indicated as the first cell.

Preferably, the radio link problem of the second BS is not reported to the first BS if the cell is not the first cell.

Preferably, the method further comprises; keeping uplink (UL) transmission to the second BS if the cell is not the first cell.

It is to be understood that both the foregoing general description and the following detailed description of the present invention are exemplary and explanatory and are intended to provide further explanation of the invention as claimed.

According to the present invention, reporting a radio link failure in a wireless communication system. Specifically, the invention can provide a solution about monitoring and reporting a radio link failure in a dual connectivity system.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 3 is a diagram showing a control plane and a user plane of a radio interface protocol between a UE and an E-UTRAN based on a 3rd generation partnership project (3GPP) radio access network standard;

DETAILED DESCRIPTION OF THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
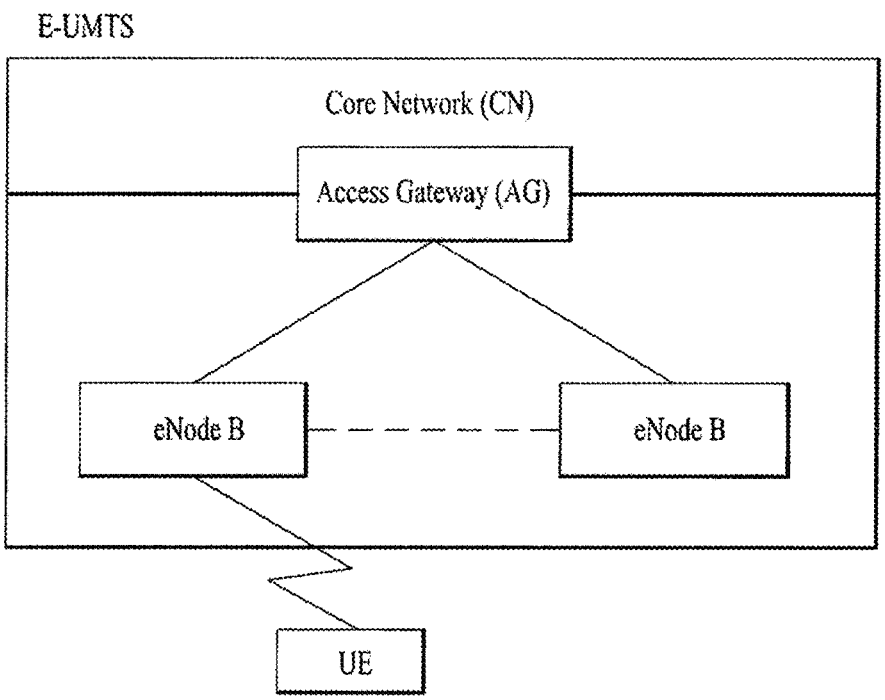
FIG. 1 is a diagram showing a network structure of an Evolved Universal Mobile Telecommunications System (E-UMTS) as an example of a wireless communication system.
Figure 2A:
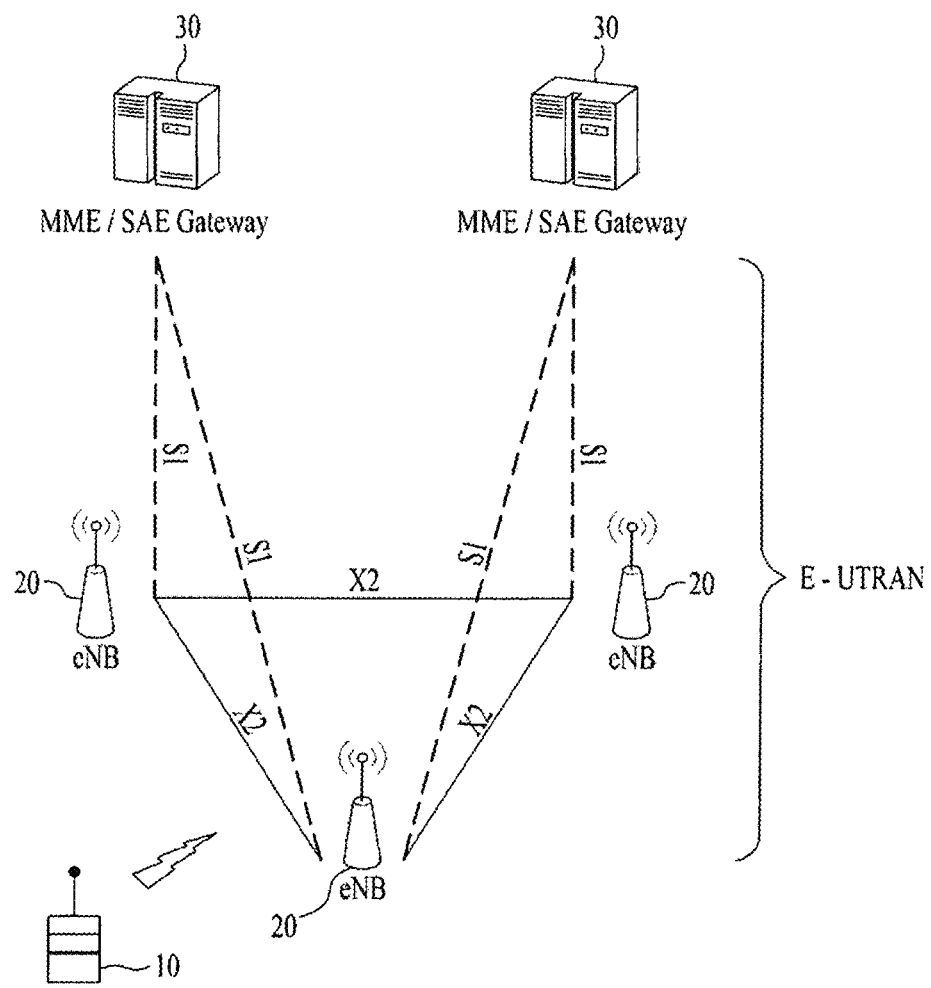
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNB 20 to UE 10, and "uplink" refers to communication from the UE to an eNB. UE 10 refers to communication equipment carried by a user and may be also referred to as a mobile station (MS), a user terminal (UT), a subscriber station (SS) or a wireless device.

Figure 2B:
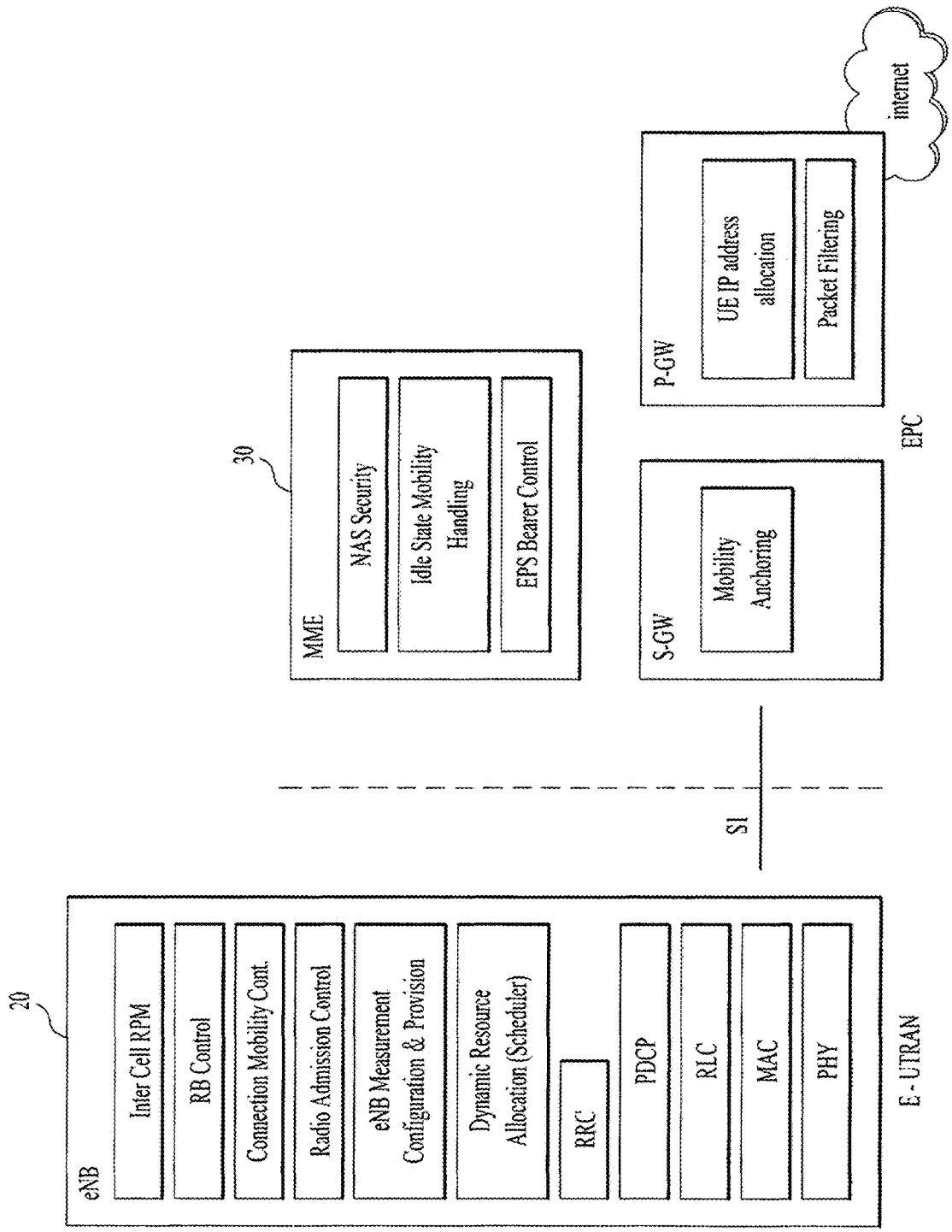
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNB 20 provides end points of a user plane and a control plane to the UE 10. MME/SAE gateway 30 provides an end point of a session and a mobility management function for UE 10. The eNB and MME/SAE gateway may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including NAS signaling to eNBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between an eNB 20 and a gateway 30 via the S1 interface. The eNBs 20 may be connected to each other via an X2 interface and neighboring eNBs may have a meshed network structure that has the X2 interface.

As illustrated, eNB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3, including views (a) and (b), is a diagram showing a control plane and a user plane of a radio interface protocol between a UE and an E-UTRAN based on a 3GPP radio access network standard. The control plane shown in view (a) of FIG. 3 refers to a path used for transmitting control messages used for managing a call between the UE and the E-UTRAN. The user plane shown in view (b) of FIG. 3 refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
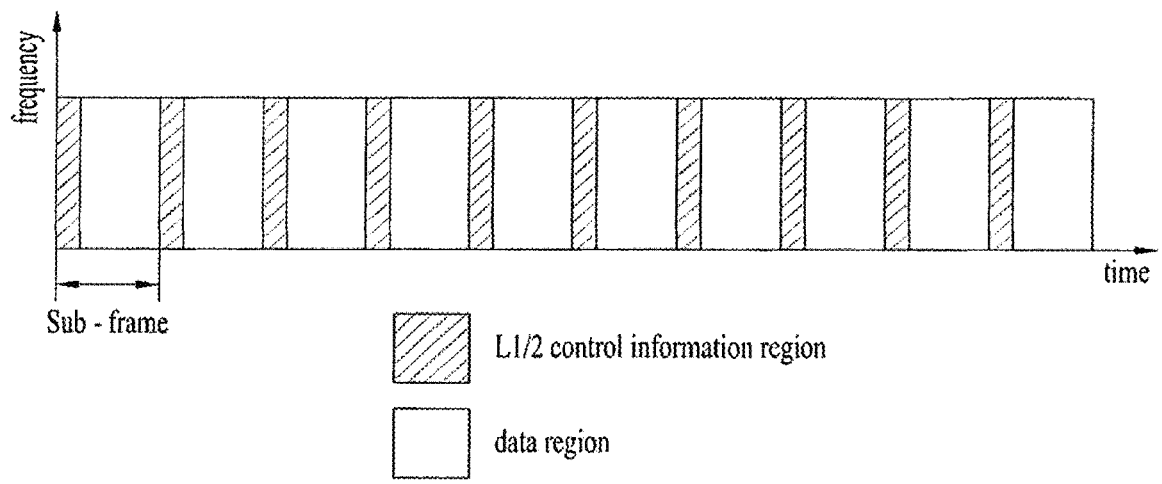
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
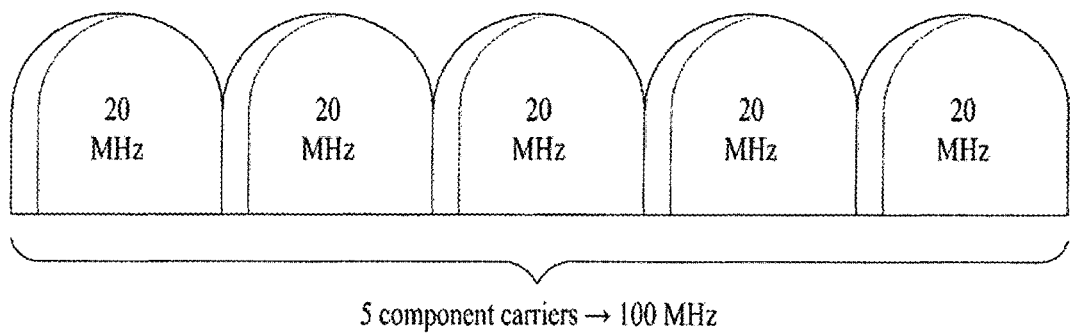
FIG. 5 is a diagram for carrier aggregation.

FIG. 5 is a diagram for carrier aggregation.

Carrier aggregation technology for supporting multiple carriers is described with reference to FIG. 5 as follows. As mentioned in the foregoing description, it may be able to support system bandwidth up to maximum 100 MHz in a manner of bundling maximum 5 carriers (component carriers: CCs) of bandwidth unit (e.g., 20 MHz) defined in a legacy wireless communication system (e.g., LTE system) by carrier aggregation. Component carriers used for carrier aggregation may be equal to or different from each other in bandwidth size. And, each of the component carriers may have a different frequency band (or center frequency). The component carriers may exist on contiguous frequency bands. Yet, component carriers existing on non-contiguous frequency bands may be used for carrier aggregation as well. In the carrier aggregation technology, bandwidth sizes of uplink and downlink may be allocated symmetrically or asymmetrically.

Multiple carriers (component carriers) used for carrier aggregation may be categorized into primary component carrier (PCC) and secondary component carrier (SCC). The PCC may be called P-cell (primary cell) and the SCC may be called S-cell (secondary cell). The primary component carrier is the carrier used by a base station to exchange traffic and control signaling with a user equipment. In this case, the control signaling may include addition of component carrier, setting for primary component carrier, uplink (UL) grant, downlink (DL) assignment and the like. Although a base station may be able to use a plurality of component carriers, a user equipment belonging to the corresponding base station may be set to have one primary component carrier only. If a user equipment operates in a single carrier mode, the primary component carrier is used. Hence, in order to be independently used, the primary component carrier should be set to meet all requirements for the data and control signaling exchange between a base station and a user equipment.

Meanwhile, the secondary component carrier may include an additional component carrier that can be activated or deactivated in accordance with a required size of transceived data. The secondary component carrier may be set to be used only in accordance with a specific command and rule received from a base station. In order to support an additional bandwidth, the secondary component carrier may be set to be used together with the primary component carrier. Through an activated component carrier, such a control signal as a UL grant, a DL assignment and the like can be received by a user equipment from a base station. Through an activated component carrier, such a control signal in UL as a channel quality indicator (CQI), a precoding matrix index (PMI), a rank indicator (RI), a sounding reference signal (SRS) and the like can be transmitted to a base station from a user equipment.

Resource allocation to a user equipment can have a range of a primary component carrier and a plurality of secondary component carriers. In a multi-carrier aggregation mode, based on a system load (i.e., static/dynamic load balancing), a peak data rate or a service quality requirement, a system may be able to allocate secondary component carriers to DL and/or UL asymmetrically. In using the carrier aggregation technology, the setting of the component carriers may be provided to a user equipment by a base station after RRC connection procedure. In this case, the RRC connection may mean that a radio resource is allocated to a user equipment based on RRC signaling exchanged between an RRC layer of the user equipment and a network via SRB. After completion of the RRC connection procedure between the user equipment and the base station, the user equipment may be provided by the base station with the setting information on the primary component carrier and the secondary component carrier. The setting information on the secondary component carrier may include addition/deletion (or activation/deactivation) of the secondary component carrier. Therefore, in order to activate a secondary component carrier between a base station and a user equipment or deactivate a previous secondary component carrier, it may be necessary to perform an exchange of RRC signaling and MAC control element.

The activation or deactivation of the secondary component carrier may be determined by a base station based on a quality of service (QoS), a load condition of carrier and other factors. And, the base station may be able to instruct a user equipment of secondary component carrier setting using a control message including such information as an indication type (activation/deactivation) for DL/UL, a secondary component carrier list and the like.

Figure 6:
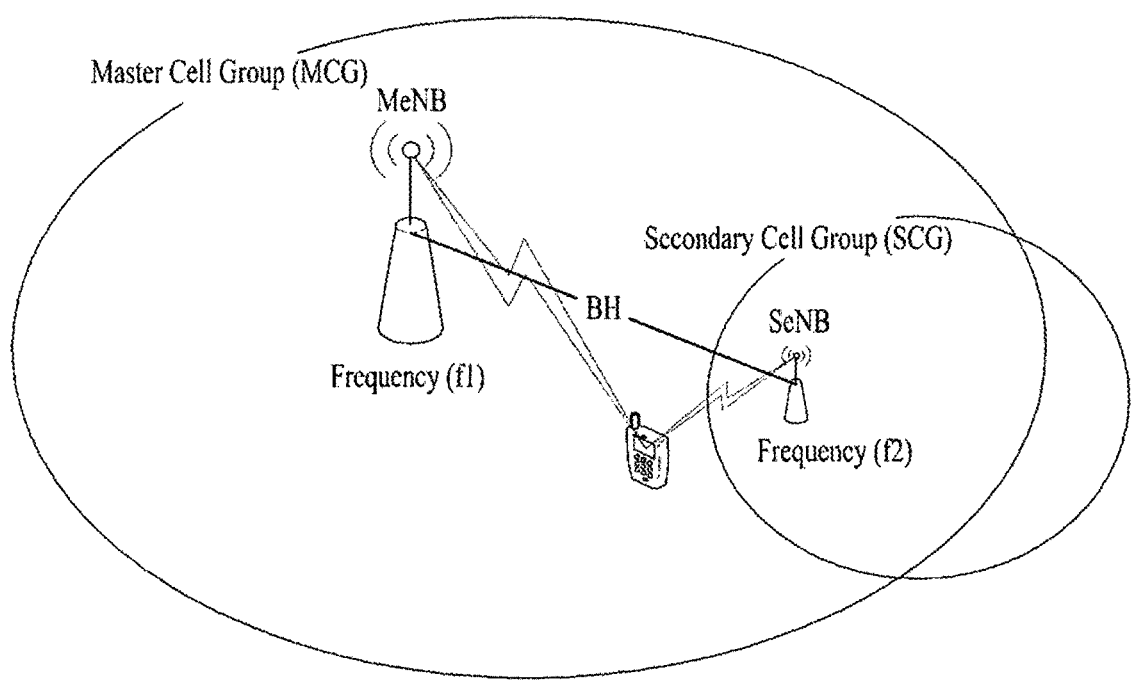
FIG. 6 is a conceptual diagram for dual connectivity between a Master Cell Group (MCS) and a Secondary Cell Group (SCG)

FIG. 6 is a conceptual diagram for dual connectivity (DC) between a Master Cell Group (MCS) and a Secondary Cell Group (SCG).

The dual connectivity means that the UE can be connected to both a Master eNB (MeNB) and a Secondary eNB (SeNB) at the same time. The MCG is a group of serving cells associated with the MeNB, comprising of a PCell and optionally one or more SCells. And the SCG is a group of serving cells associated with the SeNB, comprising of the special SCell and optionally one or more SCells. The MeNB is an eNB which terminates at least S1-MME (S1 for the control plane) and the SeNB is an eNB that is providing additional radio resources for the UE but is not the MeNB.

With dual connectivity, some of the data radio bearers (DRBs) can be offloaded to the SCG to provide high throughput while keeping scheduling radio bearers (SRBs) or other DRBs in the MCG to reduce the handover possibility. The MCG is operated by the MeNB via the frequency of f1, and the SCG is operated by the SeNB via the frequency of f2. The frequency f1 and f2 may be equal. The backhaul interface (BH) between the MeNB and the SeNB is non-ideal (e.g. X2 interface), which means that there is considerable delay in the backhaul and therefore the centralized scheduling in one node is not possible.

Figure 7:
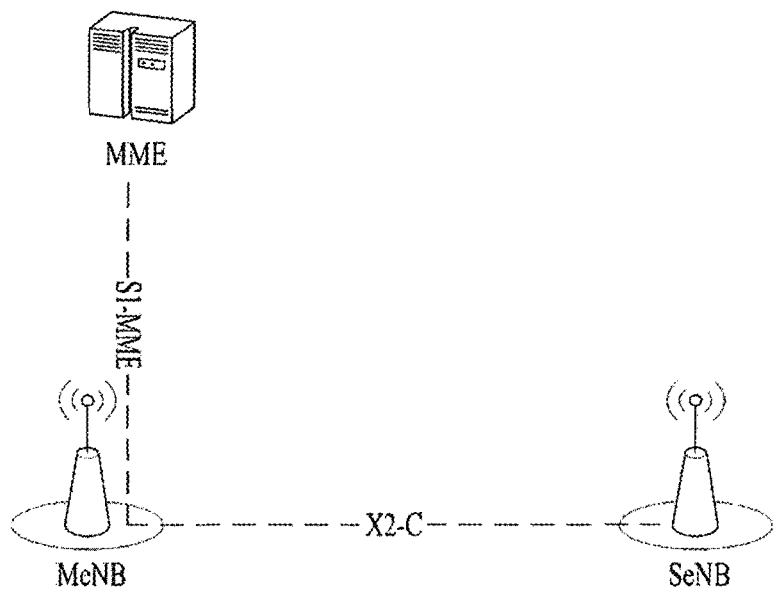
FIG. 7 is a conceptual diagram for C-Plane connectivity of base stations involved in dual connectivity.

FIG. 7 shows C-plane (Control Plane) connectivity of eNBs involved in dual connectivity for a certain UE: The MeNB is C-plane connected to the MME via S1-MME, the MeNB and the SeNB are interconnected via X2-C (X2-Control plane). As shown in FIG. 7, Inter-eNB control plane signaling for dual connectivity is performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB is performed by means of X2 interface signaling.

Figure 8:
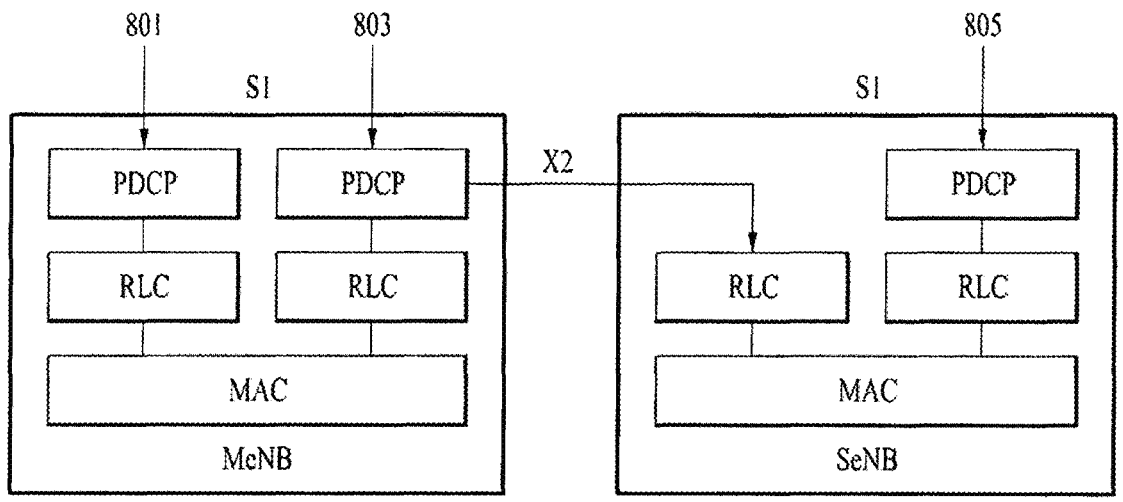
FIG. 8 is a conceptual diagram for radio protocol architecture for dual connectivity.

FIG. 8 is a conceptual diagram for radio protocol architecture for dual connectivity.

E-UTRAN of the present example can support dual connectivity operation whereby a multiple receptions/transmissions(RX/TX) UE in RRC_CONNECTED is configured to utilize radio resources provided by two distinct schedulers, located in two eNBs (or base stations) connected via a non-ideal backhaul over the X2 interface. The eNBs involved in dual connectivity for a certain UE may assume two different roles: an eNB may either act as the MeNB or as the SeNB. In dual connectivity, a UE can be connected to one MeNB and one SeNB.

In the dual connectivity operation, the radio protocol architecture that a particular bearer uses depends on how the bearer is setup. Three alternatives exist, MCG bearer (801), split bearer (803) and SCG bearer (805). Those three alternatives are depicted on FIG. 8. The SRBs (Signaling Radio Bearers) are always of the MCG bearer and therefore only use the radio resources provided by the MeNB. The MCG bearer (801) is a radio protocol only located in the MeNB to use MeNB resources only in the dual connectivity. And the SCG bearer (805) is a radio protocol only located in the SeNB to use SeNB resources in the dual connectivity.

Specially, the split bearer (803) is a radio protocol located in both the MeNB and the SeNB to use both MeNB and SeNB resources in the dual connectivity and the split bearer (803) may be a radio bearer comprising one Packet Data Convergence Protocol (PDCP) entity, two Radio Link Control (RLC) entities and two Medium Access Control (MAC) entities for one direction. Specially, the dual connectivity operation can also be described as having at least one bearer configured to use radio resources provided by the SeNB.

Figure 9:
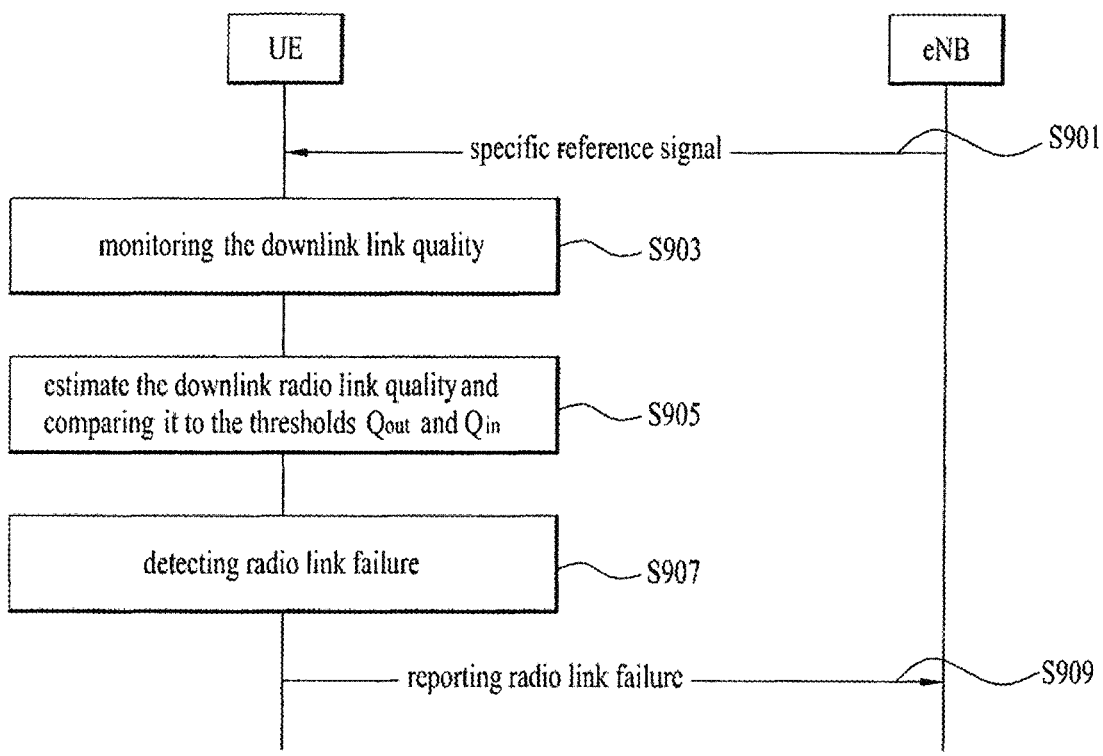
FIG. 9 is a conceptual diagram for performing Radio Link Monitoring (RLM) and Radio Link Failure (RLF)

FIG. 9 is a conceptual diagram for performing Radio Link Monitoring (RLM) and Radio Link Failure (RLF).

Radio Link Monitoring (RLM)

The UE may receive a cell-specific reference signal from a cell (S901). If the UE is connected with a plurality of cells in carrier aggregation system, the UE may receive a plurality of reference signals, respectfully.

The UE may monitor the downlink link quality based on the cell-specific reference signal in order to detect the downlink radio link quality of the PCell mentioned above in FIG. 5 (S903).

The UE may estimate the downlink radio link quality and compare it to the thresholds $Q_{out}$ and Qin for the purpose of monitoring downlink radio link quality of the PCell (S905).

The threshold $Q_{out}$ is defined as the level at which the downlink radio link cannot be reliably received and may correspond to 10% block error rate of a hypothetical PDCCH transmission taking into account the PCFICH errors with transmission parameters specified in Table 1.

TABLE 1

| Attribute | Value |
| --- | --- |
| DCI format | 1A |
| Number of control | 2; Bandwidth ≥ 10 MHz |

TABLE 1-continued

| Attribute | Value |
| --- | --- |
| OFDM symbols | 3; 3 MHz ≤ Bandwidth ≤ 10 MHz |
|  | 4; Bandwidth = 1.4 MHz |
| Aggregation level (CCE) | 4; Bandwidth = 1.4 MHz |
|  | 8; Bandwidth ≥ 3 MHz |
| Ratio of PDCCH RE energy to average RS RE energy | 4 dB; when single antenna port is used for cell-specific reference signal transmission by the PCell. |
|  | 1 dB; when two or four antenna ports are used for cell-specific reference signal transmission by the PCell. |
| Ratio of PCFICH RE energy to average RS RE energy | 4 dB; when single antenna port is used for cell-specific reference signal transmission by the PCell. |
|  | 1 dB; when two or four antenna ports are used for cell-specific reference signal transmission by the PCell. |

Note 1:
DCI format 1A is defined in clause 5.3.3.1.3 in TS 36.212 [21].
Note 2:
A hypothetical PCFICH transmission corresponding to the number of control symbols shall be assumed.

The threshold $Q_{in}$ is defined as the level at which the downlink radio link quality can be significantly more reliably received than at $Q_{out}$ and shall correspond to 2% block error rate of a hypothetical PDCCH transmission taking into account the PCFICH errors with transmission parameters specified in Table 2.

TABLE 2

| Attribute | Value |
| --- | --- |
| DCI format | 1C |
| Number of control OFDM symbols | 2; Bandwidth ≥ 10 MHz |
|  | 3; 3 MHz ≤ Bandwidth ≤ 10 MHz |
|  | 4; Bandwidth = 1.4 MHz |
| Aggregation level (CCE) | 4 |
| Ratio of PDCCH RE energy to average RS RE energy | 0 dB; when single antenna port is used for cell-specific reference signal transmission by the PCell. |
|  | −3 dB; when two or four antenna ports are used for cell-specific reference signal transmission by the PCell. |
| Ratio of PCFICH RE energy to average RS RE energy | 4 dB; when single antenna port is used for cell-specific reference signal transmission by the PCell. |
|  | 1 dB; when two or four antenna ports are used for cell-specific reference signal transmission by the PCell. |

Note 1:
DCI format 1C is defined in clause 5.3.3.1.4 in TS 36.212 [21].
Note 2:
A hypothetical PCFICH transmission corresponding to the number of control symbols shall be assumed.

When higher-layer signaling indicates certain subframes for restricted radio link monitoring, the radio link quality may be monitored.

Radio Link Failure (RLF)

1) Detection of Physical Layer Problems in RRC_CONNECTED:

The UE may start timer T310, upon receiving N310 consecutive "out-of-sync" indications for the PCell from lower layers while neither T300, T301, T304 nor T311 is running.

2) Recovery of Physical Layer Problems:

Upon receiving N311 consecutive "in-sync" indications for the PCell from lower layers while T310 is running, the UE may stop timer T310 or stop timer T312, if running.

In this case, the UE maintains the RRC connection without explicit signaling, i.e. the UE maintains the entire radio resource configuration.

Periods in time where neither "in-sync" nor "out-of-sync" is reported by layer 1 do not affect the evaluation of the number of consecutive "in-sync" or "out-of-sync" indications.

3) Detection of Radio Link Failure:

The UE may consider radio link failure to be detected at least one of upon T310 expiry, upon T312 expiry, upon random access problem indication from MAC for the PCell while neither T300, T301, T304 nor T311 is running or upon indication from RLC that the maximum number of retransmissions has been reached for an SRB (S907).

The timer T310 starts upon detecting physical layer problems (i.e. upon receiving N310 (N310=Maximum number of consecutive "out-of-sync" indications received from lower layers) consecutive out-of-sync indications from lower layers) and stops upon receiving N311 (N311=Maximum number of consecutive "in-sync" indications received from lower layers) consecutive in-sync indications from lower layers, upon triggering the handover procedure and upon initiating the connection re-establishment procedure. The timer T310 expires if security is not activated, UE goes to RRC_IDLE else and initiates the connection re-establishment procedure.

The timer T300 starts transmission of RRCConnectionRequest and stops reception of RRCConnectionSetup or RRCConnectionReject message, cell re-selection and upon abortion of connection establishment by upper layers. The timer T301 starts when RRCConnectionReestabilshmentRequest is transmitted and stops when RRCConnectionReestablishment or RRCConnectionReestablishmentReject message is received as well as when the selected cell becomes unsuitable. The timer T304 starts when RRCConnectionReconfiguration message including the MobilityControl Info is received or MobilityFromEUTRACommand message including CellChangeOrder is received and stops when a criterion for successful completion of handover to EUTRA or cell change order is met (the criterion is specified in the target RAT in case of inter-RAT). Finally, the timer T311 starts upon initiating the RRC connection re-establishment procedure and stops when selection of a suitable E-UTRA cell or a cell using another RAT is performed.

And the UE may store the following radio link failure information in the VarRLF-Report by setting its fields as follows:

i) The UE may clear the information included in VarRLF-Report, if any;

ii) The UE may set the plmn-IdentityList to include the list of EPLMNs stored by the UE (i.e. includes the RPLMN);

iii) The UE may set the measResultLastServCell to include the RSRP and RSRQ, if available, of the PCell based on measurements collected up to the moment the UE detected radio link failure;

iv) The UE may set the measResultNeighCells to include the best measured cells, other than the PCell, ordered such that the best cell is listed first, and based on measurements collected up to the moment the UE detected radio link failure;

v) The UE may set the content of the locationInfo (i.e., locationCoordinates, horizontal Velocity);

vi) The UE may set the failedPCellld to the global cell identity, if available, and otherwise to the physical cell identity and carrier frequency of the PCell where radio link failure is detected; and vii) The UE may set the connectionFailureType to rlf, set the c-RNTI to the C-RNTI used in the PCell, and set the rlf-Cause to the trigger for detecting radio link failure.

The UE reports the radio link failure to the eNB (S911).

Figure 10:
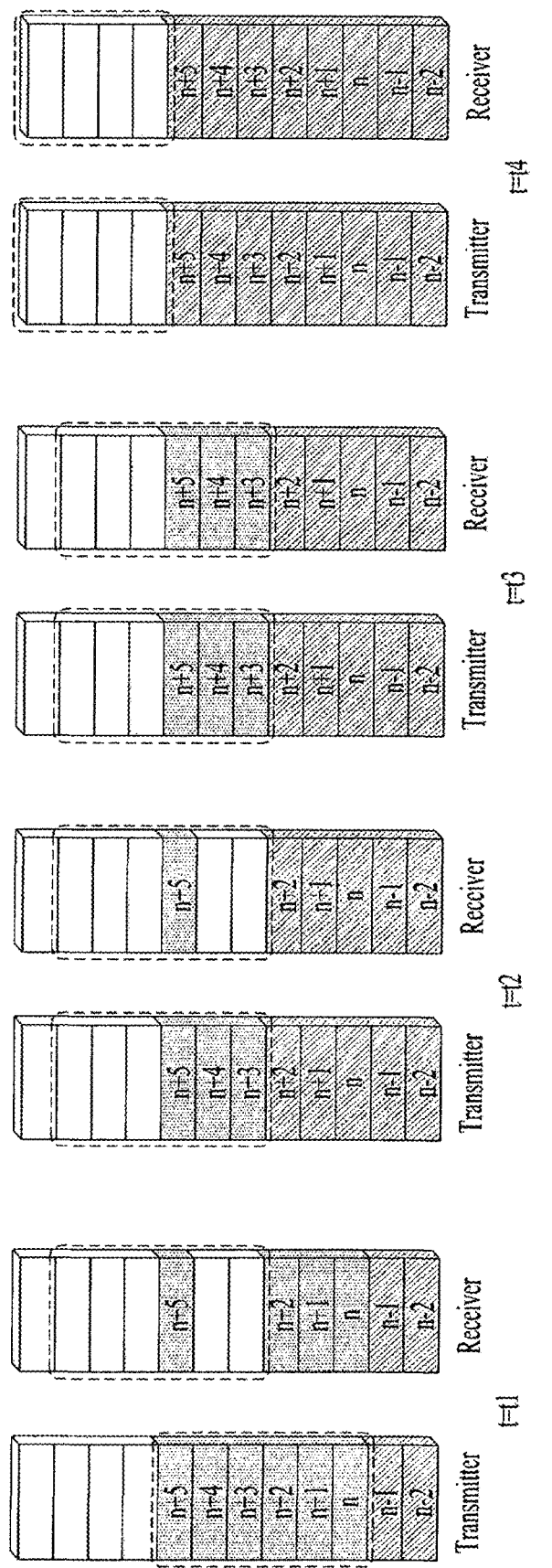
FIG. 10 is an example for RLF upon indication from RLC that the maximum number of retransmissions has been reached.

FIG. 10 is an example for RLF upon indication from RLC that the maximum number of retransmissions has been reached.

RLC status PDUs are reported as feeding back to the transmitting RLC, requesting retransmission of missing PDUs. When to feedback a status report is configurable, but a report typically contains information about multiple PDUs and is transmitted relatively infrequently. Based on the received status report, the RLC entity at the transmitter can take the appropriate action and retransmit the missing PDUs if requested.

Regarding FIG. 10, at time t=t1, PDUs up to n+5 have been transmitted. Only PDU n+5 has arrived and PDUs n+3 and n+4 are missing. This can cause a reordering timer to start. However, in this example no PDUs arrive prior to the expiration of the timer. The expiration of the timer, at time t=t2, triggers the receiver to send a control PDU containing a status report, indicating the missing PDUs, to its peer entity. Control PDUs have higher priority than data PDUs to avoid the status reports being unnecessarily delayed and negatively impact the retransmission delay. Upon reception of the status report at time t=t3, the transmitter knows that PDUs up to n+2 have been received correctly and the transmission window is advanced. The missing PDUs n+3 and n+4 are retransmitted and, this time, correctly received. The retransmission was triggered by the reception of a status report in this example. However, as the hybrid-ARQ and RLC protocols are located in the same node, tight interaction between the two is possible. The hybrid-ARQ protocol at the transmitting end could therefore inform the RLC at the transmitting end in case the transport block(s) containing PDUs n+3 and n+4 have failed. The RLC can use this to trigger retransmission of missing PDUs without waiting for an explicit RLC status report, thereby reducing the delays associated with RLC retransmissions.

Finally, at time t=t4, all PDUs, including the retransmissions, have been delivered by the transmitter and successfully received. As n+5 was the last PDU in the transmission buffer, the transmitter requests a status report from the receiver by setting a flag in the header of the last RLC data PDU. Upon reception of the PDU with the flag set, the receiver will respond by transmitting the requested status report, acknowledging all PDUs up to and including n+5. Reception of the status report by the transmitter causes all the PDUs to be declared as correctly received and the transmission window is advanced.

Status reports can, as mentioned earlier, be triggered for multiple reasons. However, to control the amount of status reports and to avoid flooding the return link with an excessive number of status reports, it is possible to use a status prohibit timer. With such a timer, status reports cannot be transmitted more often than once per time interval as determined by the timer.

For the initial transmission, it is relatively straightforward to rely on a dynamic PDU size as a means to handle the varying data rates. However, the channel conditions and the amount of resources may also change between RLC retransmissions. To handle these variations, already transmitted PDUs can be (re)segmented for retransmissions. The reordering and retransmission mechanisms described above still apply; a PDU is assumed to be received when all the segments have been received. Status reports and retransmissions operate on individual segments; only the missing segment of a PDU needs to be retransmitted.

Figure 11:
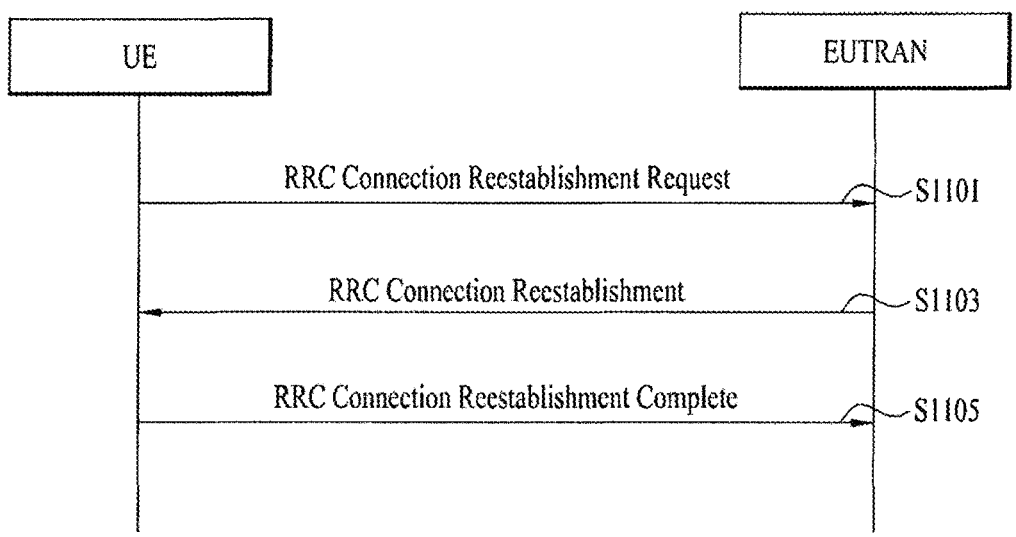
FIG. 11 is a conceptual diagram for performing Radio Resource Control (RRC) connection re-establishment.

FIG. 11 is a conceptual diagram for performing RRC connection re-establishment.

The purpose of this procedure is to re-establish the RRC connection, which involves the resumption of SRB1 (Signalling Radio Bearer1) operation, the re-activation of security and the configuration of only the PCell.

A UE in RRC_CONNECTED, for which security has been activated, may initiate the procedure in order to continue the RRC connection. The connection re-establishment succeeds only if the concerned cell is prepared i.e. has a valid UE context. In case E-UTRAN accepts the re-establishment, SRB1 operation resumes while the operation of other radio bearers remains suspended. If AS (Access Stratum) security has not been activated, the UE does not initiate the procedure but instead moves to RRC_IDLE directly.

The UE shall only initiate the procedure when AS security has been activated (S1201). The UE initiates the procedure when one of the following conditions is met:
  Upon detecting radio link failure;
  Upon handover failure;
  Upon mobility from E-UTRA failure;
  Upon integrity check failure indication from lower layers; and
  Upon an RRC connection reconfiguration failure.

When the EURTAN receives RRCConnectionReestablishmentRequest message from the UE (S1101), the EURTAN transmits RRCConnectionReestablishment command to the UE (S1103). And the UE can transmit RRCConnectionReestablishmentComplete message to the EIRTAN in order to inform of completing of the RRC connection re-establishment (S1105).

Figure 12:
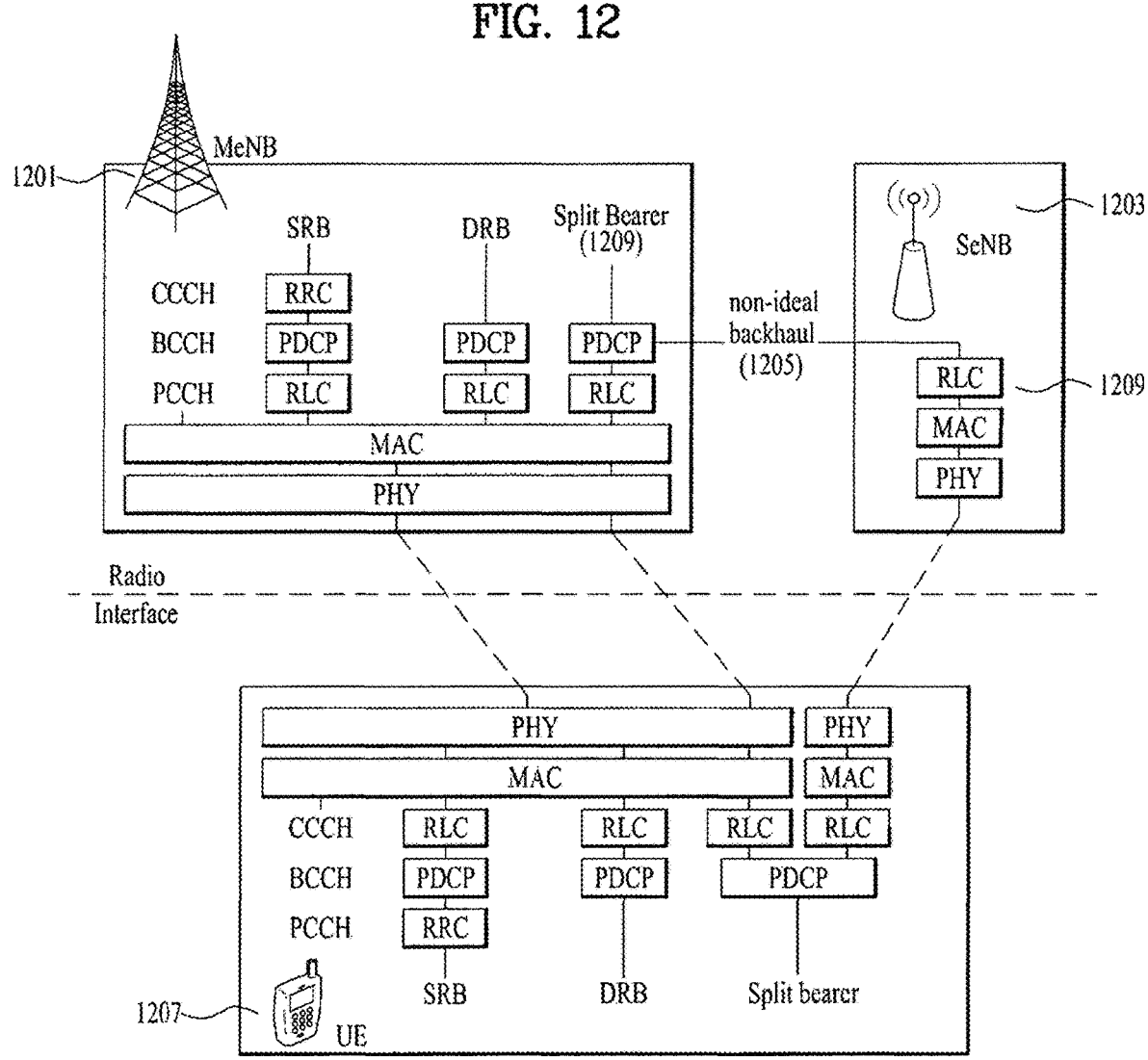
FIG. 12 is a conceptual diagram for one of radio protocol architecture for dual connectivity.

FIG. 12 is a conceptual diagram for one of radio protocol architecture for dual connectivity.

In LTE Rel-12, a new study on dual connectivity, i.e. UE is connected to both MeNB (1201) and SeNB (1203), as shown in FIG. 12. In this figure, the interface between MeNB (1201) and SeNB (1203) is called Xn interface (1205). The Xn interface (1205) is assumed to be non-ideal; i.e. the delay in Xn interface could be up to 60 ms, but it is not limited thereto.

To support dual connectivity, one of the potential solutions is for the UE (1207) to transmit data to both MCG and SCG utilizing a new RB structure called dual RLC/MAC scheme, where a single RB has one PDCP—two RLC—two MAC for one direction, and RLC/MAC pair is configured for each cell, as shown in FIG. 12. This scheme is called "Split Bearer" scheme (S1209).

In order to increase the throughput or offload the traffic, the UE may have a dual connectivity with two separate eNBs, i.e., the MeNB (1201) and the SeNB (1203).

According to the traffic condition, each eNB can have multiple serving cells for the UE and manages the resource across the serving cells belonging to the eNB. As a consequence, when the UE performs radio link monitoring (RLM) for the serving cells, the UE would report to the corresponding eNB if there is a radio link problem for a serving cell. I.e., the UE directly reports to the SeNB (1203) if there is a radio link problem on the serving cell under control of the SeNB (1203).

However, the addition/removal/modification of serving cells under the SeNB (1203) is possibly performed by the MeNB (1201) because the MeNB (1201) mainly decides whether to offload the data to the SeNB (1203) according to the traffic condition. Hence, the MeNB (1201) should know the radio link problem of a serving under the SeNB (1203) for some cases. In addition, there can be cases that the UE is not able to indicate the radio link problem to the SeNB.

Figure 13:
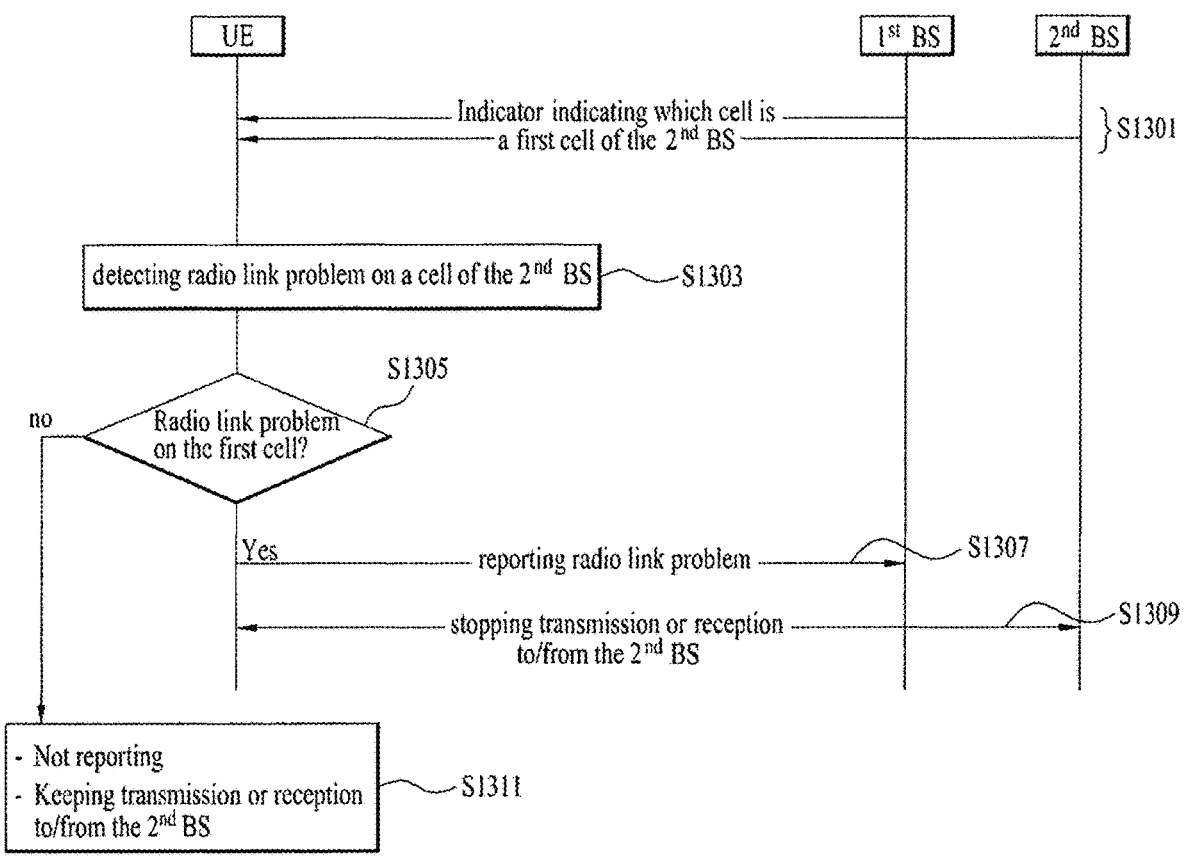
FIG. 13 is a conceptual diagram for reporting radio link problem according to embodiments of the present invention.

FIG. 13 is a conceptual diagram for reporting a radio link problem according to embodiments of the present invention.

It is invented that, when the UE is connected to the two separate base stations, i.e., the MeNB and the SeNB, the UE can receive an indicator from at least one of a first base station (BS) or a second BS (S1301).

Desirably, the first BS may be an MeNB in a MCG and the second BS may be a SeNB in a SCG, and vice versa.

Desirably, the indicator indicates which cell is a first cell of the second BS.

At least one serving cell among the serving cells served by the SeNB is designated as the first cell by the first BS or the second BS.

The first BS or the second BS can indicate which serving cell is designated as the first cell by sending a Radio Resource Control (RRC) or a Medium Access Control (MAC) signaling to the UE, including a serving cell identifier.

In this manner, the base station which determines the first cell and the base station which sends an RRC or a MAC signaling indicating the first cell to the UE can be different. For example, the MeNB determines the first cell and the SeNB informs the UE of the first cell. If the MeNB determines the first cell, the MeNB informs the SeNB of the first cell by sending a message to the SeNB over Xn interface, including a serving cell identifier.

When the UE receives an RRC or a MAC signaling from the first BS or the second BS that indicates a serving cell to be used as the first cell, the UE may considers the indicated serving cell as the first cell.

Alternatively, without reception of an RRC or a MAC signaling from the first BS or the second BS that explicitly indicates the first cell, the UE can implicitly consider a serving cell as the first cell if the serving cell fulfills a certain condition as follows:
  if the serving cell is configured with PRACH;
  if the serving cell is configured with PUCCH;
  if the serving cell supports the contention-based RA procedure; or
  if the serving cell configured to be never deactivated.

In this case, the first cell may be at least one of always activated in the second BS, allowed to perform a contention-based random access procedure, or configured with a Physical Uplink Control Channel (PUCCH).

The UE may detect a radio link problem on a cell belonging to the second BS (S1303). And the UE checks whether the radio link problem occurs on the first cell indicated by the step of S1301 (S1305).

The UE can detect the radio link problem on the first cell if a certain condition is met. The conditions can be as follows:
  Physical layer problem is detected when e.g., the first cell is out of sync for a configured time duration.
  An RLC entity whose data is transmitted on the first cell detects a problem when e.g., the maximum number of retransmissions has been reached for a RLC PDU.
  MAC layer problem is detected when e.g., the maximum number of random access preamble retransmission on the first cell has been reached.

Desirably, the first cell may be a PSCell (Primary SCell) in the SCG in dual connectivity, but it is not limited thereto.

According to a result of the S1305, if the UE detects that the radio link problem occurs on the first cell, the UE can report the radio link problem on the first cell directly to the first BS (S1307). And the UE stops any UL transmission/reception on all serving cells served by the second BS (S1309).

Desirably, when the UE reports the radio link problem indication directly to the first BS, the radio link problem indication can include the followings:

an identifier of the first cell
an identifier of the UE
a cause of the radio link problem.

When the first BS receives the radio link problem indication from the UE, the first BS informs the second of radio link problem on the first cell by sending a message over Xn interface, including the identifier of the serving cell, the identifier of the UE, or the cause of radio link problem.

When the first BS receives the radio link problem indication from the UE, the first BS may remove or deactivate the first cell, or inform the second BS of the first cell removal/deactivation, if necessary.

Meanwhile, the UE configured with dual connectivity the procedure to report SCG radio link failures. The UE may initiate transmission of the UEFailureIndication message if a dual connectivity capable UE detects an SCG failure.

The UE may set the contents of the UEFailureIndication message include scg-RLF-Cause and set it to the trigger for detecting SCG radio link failure if the UE initiates transmission of the UEFailureIndication message to provide SCG radio link failure information. The UE may submit the UEFailureIndication message to lower layers for transmission.

For dual connectivity, the radio link failure procedure is supported for PSCell. However, upon detecting RLF on this SCell, the re-establishment procedure is not triggered at the end of the first phase. Instead, UE may inform the radio link failure of PSCell to the first BS.

On the other hand, according to a result of the S1305, if the UE detects that the radio link problem occurs on the serving cells served by the second BS other than the first cell, the UE does nothing (S1311).

For example, UE MAC or UE RLC do not indicate the problem to UE RRC, UE RRC does not report the radio link problem to the first BS or the second BS, or UE keeps UL transmission on the serving cell where the radio link problem occurs (S1311).

Figure 14:
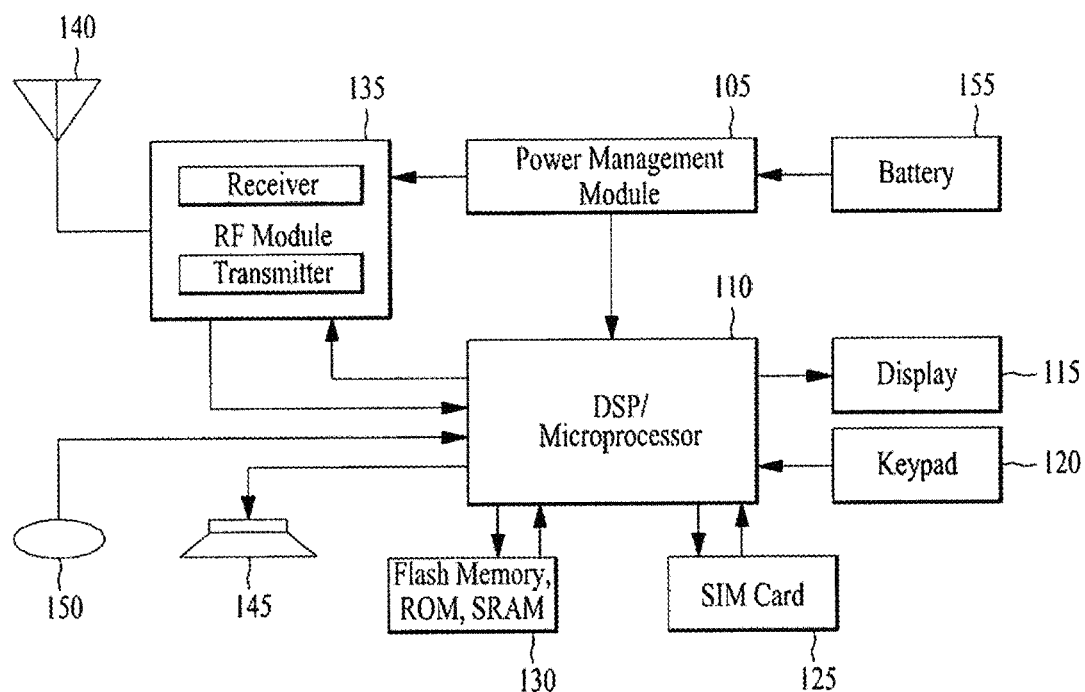
FIG. 14 is a block diagram of a communication apparatus according to an embodiment of the present invention.

FIG. 14 is a block diagram of a communication apparatus according to an embodiment of the present invention.

The apparatus shown in FIG. 14 can be a user equipment (UE) and/or eNB adapted to perform the above mechanism, but it can be any apparatus for performing the same operation.

As shown in FIG. 14, the apparatus may comprise a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 14 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 14 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

What is claimed is:

1. A method performed by a user equipment (UE) supporting dual connectivity in a wireless communication system, the method comprising:

determining whether a first cell or at least one second cell has a radio link problem associated with a secondary base station (BS), wherein the secondary BS is associated with a plurality of serving cells comprising the first cell and the at least one second cell, and wherein the first cell supports a contention based random access; and informing a master BS about the radio link problem based on a determination that the first cell has the radio link problem, wherein the UE includes two medium access control (MAC) entities: a first MAC entity for the master BS and a second MAC entity for the secondary BS.

2. The method according to claim 1, wherein the first cell is activated in the secondary BS based on a determination that the first cell does not have the radio link problem.

3. The method according to claim 1, wherein the first cell supports a Physical Uplink Control Channel (PUCCH) transmission.

4. The method according to claim 1, wherein, based on the first cell being out of sync for a configured time duration, the UE determines that the first cell has the radio link problem.

5. The method according to claim 1, wherein, based on a maximum number of random access preamble retransmissions on the first cell having been reached, the MAC entity for the secondary BS determines that the first cell has the radio link problem, and wherein the UE informs the master BS about the radio link problem via radio resource control (RRC) signaling.

6. The method according to claim 1, further comprising: stopping all uplink (UL) transmissions to the secondary BS based on the determination that the first cell has the radio link problem.

7. The method according to claim 1, wherein the UE reports a cause of the radio link problem based on the determination that the first cell has the radio link problem.

8. The method according to claim 1, wherein, based on a determination that the at least one second cell has the radio link problem, the UE does not indicate the radio link problem to an upper layer or the UE does not inform the master BS about the radio link problem.

9. The method according to claim 1, wherein based on a determination that the at least one second cell has the radio link problem, the UE keeps uplink (UL) transmission to the secondary BS.

10. The method according to claim 1, wherein serving cells of the master BS belongs to a master cell group (MCG) and serving cells of the secondary BS belongs to a secondary cell group (SCG).

11. A user equipment (UE) configured to support dual connectivity in a wireless communication system, the UE comprising:

a transceiver; and a processor configured to control the transceiver, wherein the processor is further configured to:

determine whether a first cell or at least one second cell has a radio link problem associated with a secondary base station (BS), wherein the secondary BS is associated with a plurality of serving cells comprising the first cell and the at least one second cell, and wherein the first cell supports a contention based random access; and inform a master BS about the radio link problem based on a determination that the radio link problem has occurred on the first cell associated with the secondary BS, wherein the UE includes two medium access control (MAC) entities: a first MAC entity for the master BS and a second MAC entity for the secondary BS.

12. The UE according to claim 11, wherein the first cell is activated in the secondary BS based on a determination that the first cell does not have the radio link problem.

13. The UE according to claim 11, wherein the first cell supports a Physical Uplink Control Channel (PUCCH) transmission.

14. The UE according to claim 11, wherein, the processor is further configured to:

based on the first cell being out of sync for a configured time duration, determine that the first cell has the radio link problem.

15. The UE according to claim 11, wherein, based on a maximum number of random access preamble retransmissions on the first cell having been reached, the MAC entity for the secondary BS determines that the first cell has the radio link problem, and wherein the processor is further configured to report the radio link problem to the master BS via radio resource control (RRC) signaling.

16. The UE according to claim 11, wherein the processor is further configured to stop all uplink (UL) transmissions to the secondary BS based on the determination that the first cell has the radio link problem.

17. The UE according to claim 11, wherein the processor is configured to report a cause of the radio link problem based on the determination that the first cell has the radio link problem.

18. The UE according to claim 11, wherein the processor is further configured to:

based on a determination that the at least one second cell has the radio link problem, not indicate the radio link problem to an upper layer or not report the radio link problem to the master BS.

19. The UE according to claim 11, wherein the processor is further configured to:

keep uplink (UL) transmission to the secondary BS based on a determination that the at least one second cell has the radio link problem.

20. The UE according to claim 11, wherein serving cells of the master BS belongs to a master cell group (MCG) and serving cells of the secondary BS belongs to a secondary cell group (SCG).

* * * * *